United States Patent Office 3,446,393
Patented May 27, 1969

3,446,393
STORAGE CONTAINER FOR PRESSURIZED FLUIDS
Vernon A. Falkenau, Mishawaka, Ind., assignor to Uniroyal, Inc., New York, N.Y., a corporation of New Jersey
No Drawing. Filed Aug. 25, 1967, Ser. No. 663,202
Int. Cl. B65d 25/14, 25/34
U.S. Cl. 220—64                                    12 Claims

ABSTRACT OF THE DISCLOSURE

This invention relates to a storage container for holding fluids which comprises a liner, consisting of a plurality of layers of electroplatable metals, separated by interrupting layers of solid impervious film-forming material, surrounded by a resin-impregnated glass filament reinforcing structure.

---

The present invention relates to a container which is used for storing various fluids under widely varied conditions of temperature and pressure; more specifically the present invention relates to a container which consists of a multi-layered liner which is surrounded by a high strength resin impregnated glass filament reinforcing filament. The combination of the multi-layered liner surrounded by the glass reinforcement winding provides a container which is light-weight, capable of storing fluids therein at pressures up to 20,000 p.s.i., depending upon the strength of the outer filament wound casing, and has outstanding strength to weight characteristics.

A problem long associated with storage vessels or containers that are designed to hold fluids under pressure is that the liner portion of the vessel which is in contact with the pressurized fluid is generally permeable to said fluid due to the high internal pressures.

The two specific reasons why the liners disclosed in the prior art have been unsatisfactory are: (1) Liner sponging which results from high pressure air diffusion into the liner material. Upon a sudden release of pressure, internal bubbles form in the liner material. Failure of these bubbles under tension results in subsequent liner leakage. (2) Liner separation: The result of air absorption and subsequent bubble entrapment at liner-case interface results when the permeability of the liner is higher than that of the filament wound case. Upon a sudden release of pressure, accumulation of gas results in liner separation and bubble formation.

It has been found that certain types of metals can act as satisfactory barriers to or liners for many types of reactive materials which are stored therein under pressure thereby eliminating the aforesaid problems. However, forming the metal into a tank shape is a problem because the metal must be welded or joined together by some method which necessitates the formation of seams. Dependability of these seams is often questionable. The solution to the problem of permeability and construction of a continuous liner without seams provided by the present invention is to form a number of continuous metallic layers using an electrodeposition method thereby eliminating the need for shaping, forming and welding of a sheet film to make a liner.

A problem with using the standard electroformed metallic film as a liner is that such liners have failed due to the porosity of the electroformed films. Porosity is a common phenomenon caused by impurities, air traps, or gas (hydrogen) on the substrate film, which occurs when a metallic film is electroformed onto another metal substrate film. Thus by way of example, if a substrate layer has a number of minute holes in it due to air traps or gas bubbles an attempt to plate a surface layer of metal over the substrate layer does not succeed in covering up said holes, air traps or gas bubbles on the substrate. The surface layer of metal contains minute holes at the corresponding location of said holes found in the substrate.

The improved metallic liner of the present invention consists of a plurality of layers of differing materials and is made by plating a predetermined amount of a metal such as copper, nickel, gold or silver onto a mandrel, interrupting the plating, to apply an interrupting layer of solid, impervious, film forming materials including nonmetallic materials such as thermosetting or thermoplastic resins, or metallic materials such as solders (applying a conductive coating onto the interrupting layer, if a non-conductive interrupting layer is used) replating another predetermined amount of metal (the same or a different metal) and repeating the steps of sandwiching an interrupting layer of a solid impervious film-forming material between metallic layers as many times as desired. The laminated films of metal which have the normal porosity caused by impurities, air traps or gas are interrupted and the porous holes through one lamina do not line up with the porous holes in subsequent laminas.

For example in a liner (also referred to as an impervious barrier structure) requiring three or more nickel plated layers, the first nickel coat is electrodeposited on a suitable mandrel and a first interrupting layer of a metallic substance is applied from a molten alloyed bath (i.e. a tin-silver alloy at a temperature of 550° F.). More nickel is electrodeposited and a second interrupting layer used is obtained from a molten metal bath of tin applied at a temperature of 450° F. The procedure of using successively lower melting point baths eliminates any delamination in the preceding interrupting layers applied to the metal layers. Thus if additional nickel plated layers are required additional applications of interrupting layers from molten baths having progressively lower melting points are used by the proper selection of an impervious film forming metal or metal alloy.

Solders comprising Cu, Sn, Pb, Sb, Cd, Bi, Zn, Ag, Hg, Tl, or mixtures thereof, can be used as the barrier or interrupting layer as long as the melting point of each interrupting layer applied is below that of the previously applied interrupting layer.

Examples of some solders which can be used as a metallic interrupting layer in the present invention are: tin 63%-lead 37%; tin 50%-lead 32%-cadmium 18%; lead 87%-antimony 13%; cadmium 82.6%-zinc 17.4%; tin 95%-antimony 5%; lead 98%-tellurium 2%. In addition other solders within a sharp melting point range can be used. ("Sharp melting point range" means a eutectic or near eutectic mixture.)

Alternatively a thermosetting or thermoplastic resin can be used as the interrupting layer, or solder and resin can be alternated in the liner. Thermosetting resins which can be used effectively to form interrupting layers are those which cross-link in the presence of air. Examples of such resins are polyester resins such as "Vibrin 117," epoxy resins such as a glycidyl ether which is the reaction product of bisphenol A and epichlorohydrin known as "Epon 828" and phenolic resins obtained by the condensation of phenol or substituted phenols with aldehydes such as formaldehyde, acetaldehyde and furfuraldehyde.

It is desirable to maintain the interrupting layers as thin as possible especially in applications where the total weight of the product is of principal concern, and also to preclude the possibility of sponging in the plastic layer. Generally the thickness of the interrupting layer is less than 10 mils and preferably is between about ½ to 5 mils. Both the solder and thermosetting resin may be applied to the electroform metal layer by means of brushing, spraying, wiping, dipping or combinations thereof. The thermosetting resin is applied to the electroformed metallic surface preferably by spraying. Suitable thermoplastic resins which can be used as interrupting layers in the present invention are acrylic resins, consisting of a series of polymeric esters of methacrylic acid such as Lucite; urethane resins made by the reaction of diisocyanate and a polyalkylene ether glycol such as "Royal R–E8"; vinyl polymers such as polyvinylchloride, copolymers containing vinylchloride and solutions of ABS.

If desired, the resins are dissolved in solvents such as methyl ethyl ketone, xylene, toluol, ethylacetate, etc. to facilitate producing the desired impervious film. The amount of solvent employed will depend upon the solids content of resin (and curing agent if present) which provides the best coverage in the film thicknesses desired. Generally the percent total solids is from 20 to 40%, based on weight of the mixture. A preferred solvent blend is made up of 10 parts toluol and 1 part of the mono or dialkyl ether of ethylene glycol (or derivative thereof).

When solder is employed as the interrupting layer in an alternating manner with resin, the temperatures at which the thermosetting resin is applied (and cured if necessary) must be below the temperatures which will melt or damage the solder layer.

One factor which affects the temperature necessary to form a thermoset resin interrupting layer is the temperature at which the resin cures. Depending upon the type and amount of curing agent used, the composition will cure at room temperature or may require higher temperatures.

In all instances the thermoset resin system employed both in terms of application and curing temperature is selected to conform to any limitations imposed by the type of mandrel used, the electrodeposited metals and solders (if employed).

Some typical interrupting layers used in the present invention and made from thermosetting resins and curing agents are listed in table below.

TABLE

| | Composition | Parts by weight | Curing temp., (° F.) | Duration of cure (hr.) |
|---|---|---|---|---|
| A | "Epon 828" | 100 | [1] 200 | 2 |
| | Meta-phenylene-diamine | 12.5 | | |
| B | "Epon 828" | 100 | [1] 200 | ½ |
| | Triethylene tetramine | 6 | | |
| C | "Epon 828" | 100 | 150 | 2 |
| | Polyamide ("Veramide 115") | 40 | | |
| D | Polyester resin "Vibrin 117" | 100 | 150 | ½ |
| | Styrene (monomer) | 10 | | |
| | Benzoyl peroxide | 1.5 | | |
| | Cobalt naphthenate | 0.6 | | |

[1] Will cure at room temperature but it is preferred to accelerate the cure at temperature indicated.

It is preferred to surround the liner with a wet glass winding (a glass roving containing a sticky resin) because this permits the use of fewer glass ends to obtain a closely spaced parallel winding ribbon. The preferred design for making a pressure container for fluids is based upon using geodesic windings about the liner throughout the entire vessel for the axial windings. Small deviations from the geodesic angle will not adversely affect the strength provided by the respective windings. However, such angle deviations will cause objectional filament slippage when wet winding. Therefore, a preimpregnated glass roving can be used for winding the pressure containers. The greater tack of preimpregnated glass roving precludes filament slippage.

The type of preimpregnated roving used to wind about the liner tends to form slight interstices at the ribbon crossovers. These interstices are detrimental to establishing optimum interlaminar shear properties between rovings. Therefore, additional epoxy resin such as Epoxy 41021–1, formulated to be the same as the impregnated roving binder, is used periodically between winding layers to fill the crossover gaps.

The mandrel, upon which the electroformed layers are deposited is constructed of a variety of materials depending upon the final shape of the container to be made. If the shape of the liner is to be similar to a glass tumbler with an open top, it is possible to use a reusable permanent mandrel made from glass, ceramic, stainless steel, chrome-plated brass or bronze. When it is not possible to remove the mandrel without destroying the container, a mandrel material with a relatively low melting point must be used; or one which will dissolve in a solution which does not attack the nickel, copper, gold or silver liner.

Materials with low melting points suitable for use as mandrels are waxes, "Cerro"-metals, rigid plastisols, and other thermoplastic polymers such as polyvinylacetate butyrate or ABS plastic. Again it must be emphasized that the melting point of the mandrel material used, must be such as not to cause softening of the metals or decomposition of resins used in the liner or in the filament wound casing.

Examples of metals that can be dissolved out of the liner are aluminum, which can be dissolved out using sodium hydroxide, or copper, iron and tin which can be dissolved out using various acids such as nitric, hydrochloric, and sulfuric. The choice here is the use of a metal and a solution to dissolve it that does not attack the metal used at the interface of the liner and mandrel. Mandrels made from crystalline materials such as salt, sugar, etc. which can be removed with water at various temperatures can be used.

Two methods of construction of the multi-layer systems used to form the liner of the present invention are possible, and the same mandrel system can be used with each. When using a mandrel of electrically conductive metal, such as aluminum it is possible to electroform directly on the surface of the mandrel. In the case of non-conductive mandrels such as wax or plastic based mandrels it is necessary to provide a conductive coating on the surface thereof that permits electrodeposition.

A roller type knurling tool was designed and fabricated to impart a crinkle design to the surface of the mandrel. This results in the formation of a liner having a crinkled surface. This type of liner is preferred because the crinkles allow expansion and contraction of the liner when in use thus lessening the chances of permanently deforming the liner.

It has been found advantageous to coat the entire surface of the mandrel whether it is conductive or non-conductive with a thin film of conductive reduced silver. Since silver is highly conductive, it provides a good base for the electrodeposition of the first layer of the liner. The preparation of conductive mandrels used for electrodeposition is described in Examples 1 and 2.

Example 1

One container of a double headed spray gun is filled with an ammoniacal solution of silver nitrate (20 g./l.) and the other container is filled with a solution of 37% formaldehyde. The mandrel is dipped in a stannous chloride solution to sensitize the surface and while wet, the surface is sprayed simultaneously with the two solutions using the aforementioned spray gun. The mandrel is thus covered with a thin continuous silver coating and is ready for electrodeposition.

Example 2

This example illustrates the preparation of a non-conductive mandrel such as one made from plaster of paris. A plaster of paris mandrel of desired dimensions and shape is submerged in a molten wax bath at a temperature above 212° F. so as to remove residual water and to impregnate the plaster with the wax. This treatment makes the plaster unreactive in the plating solutions. The wax surface is checked to ascertain that there is no oil or dirt thereon. The mandrel is then dipped in the stannous chloride solution and sprayed with the two solutions which react to form a reduced silver coating as outlined in Example 1.

A conductive copper coating can be applied to a mandrel using the chemical reduction method described in Examples 1 and 2. In addition, it is possible to apply finely ground particles of silver or graphite onto the surface of a mandrel in order to make it conductive.

The following examples illustrate the preparation of the liner as contemplated in the present invention.

Example 3

The mandrel prepared in Example 1 is placed in a standard sulfamate nickel plating bath, and said mandrel is plated at 15 to 20 amps per square foot at a temperature of 115° F. to obtain approximately 1 mil of thickness per hour of plating. The mandrel is removed from the plating bath after 1 hour, rinsed thoroughly, and inspected for defects. Obvious pits or pores present on the surface of the plated metal are repaired using a "Dalic" brush plating system. The plated mandrel is heated to 600° F. and "tinned" using an acid flux (No. 42 soldering flux—Hi Grade Alloy Corp.) and a tin-silver alloy containing 5% silver and 95% tin with soft stainless steel bristle brush. The surface of the nickel layer wets out readily and a film of solder approximately 1 mil in thickness is appled. The plated and "tinned" mandrel is inspected for imperfect coverings, is refined using a gas flame and is cooled, cleaned, rinsed in water, dipped in dilute hydrochloric acid and scrubbed with a steel brush while in the acid solution. The "tinned" mandrel is removed from the acid bath, rinsed and immediately placed in the sulfamate nickel plating bath. One mil of nickel is applied as before. The plated mandrel is removed, rinsed in water, heated to 475° F. and the hot surface of the nickel is fluxed and "tinned" with a pure tin solder (M.P. 450° F.) and brushed as before. Any flaws are refined by cautiously using a gas flame, so that the liner is not overheated thus causing remelting of the initial solder layer. The surface of the tin layer is scrubbed with water and immersed in dilute hydrochloric acid, scrubbed, rinsed and immediately placed in the plating bath until another one mil of nickel is applied. The plated mandrel is removed from the bath, rinsed and inspected for flaws. Here again, the flaws are repaired with nickel using a "Dalic" brush plating system. The mandrel, now covered with multiple layers of nickel, tin-silver solder, nickel, tin solder and nickel is wound with a high strength epoxy resin impregnated glass filament reinforcing structure as described in United States Patents 3,144,952 and 3,276,936 to Uhlig et al. The mandrel is then removed as follows:

The finished container is supported in an upright position and a 30% solution of sodium hydroxide is circulated through the interior of the mandrel to dissolve the aluminum. A vent is installed in the circulating system to vent the hydrogen evolved from the reaction. The interior of the container, after washing is then suitable for holding fluids.

Example 4

A mandrel prepared as in Example 2 is placed in sulfamate bath as described in Example 3 and plated to obtain one mil of nickel. The plated mandrel is rinsed thoroughly, inspected for flaws, dried and coated with a one mil layer of "Epon 828" containing meta-phenylenediamine curative (see Table 1) and is cured at 200° F. for two hours. The surface is inspected for obvious flaws after gelling of the resin, and before curing, and if any flaws are found they are touched in with a small brush containing the same epoxy composition. The surface of the resin-coated mandrel is then washed and scrubbed in a weak alkaline solution such as "Oakite," rinsed in water, degreased with methylethyl ketone, is then dipped in a sensitizing solution containing hydrochloric acid and stannous chloride. The sensitized surface while still wet is sprayed with the silver solution having the composition described in Example 1. This gives a conductive surface of silver. The silvered mandrel is further plated with one mil of nickel. The procedure for rinsing, degreasing, cleaning, sensitizing and silvering is performed again after a second epoxy coating of approximately 1 mil is applied. A third layer of nickel is then applied as before. After each of the nickel plating cycles any obvious flaws are repaired with the "Dalic" plating system. After the required number of layers is complete, the resin impregnated reinforcing glass filament is wound about the liner and the mandrel is removed using the technique outlined in the above cited Uhlig et al. patents.

In order to use the storage containers described in Examples 3 and 4, it is necessary to provide fittings by which the container can be loaded and discharged. One or two fitting plugs are attached at opposite ends of the mandrel prior to the electrodeposition of metal. Since the metal of the fitting plug flange is relatively thicker than the liner laminate, there is an abrupt change at the fitting flange-liner junction. In order to reduce the localized stresses which result from the abrupt change at the fitting flange-liner junction, the electrodeposited metal is tapered from about 0.002 inch on the first layer of the liner to about 0.050 inch at the junction point up and over the fitting. This results in a smooth contoured liner which has a buildup at each end of the liner where the liner joins the fitting flange. The tapering of the liner using the electroformed metal is achieved using contoured anode baskets with shielding. It is necessary to fabricate shaped conforming anodes in order that electroforming of the thin liner section is uniform over all of the mandrel despite the contours present therein.

The liners made in accordance with the methods described in Examples 3 and 4 were tested and found to store cryogenic materials and corrosive materials effectively and were capable of withstanding high internal pressures.

Having thus described my invention, what I claim and desire to protect by Letters Patent is:

1. A storage container for fluids comprising a multi-layered liner surrounded by a resin-impregnated glass filament reinforcing structure, said multi-layered liner comprising a plurality of layers of an electroplatable metal, said metallic layers being separated by interrupting layers of solid impervious film-forming material.

2. The storage container of claim 1 having a fitting plug present therein, the junction of said plug and liner being covered by an additional amount of said electroplatable metal, over and above the amount of said metal which forms the liner of said container.

3. The storage container of claim 1 wherein each successive interrupting layer applied after the first interrupting layer has a lower melting point than the preceding layer.

4. The storage container of claim 1 wherein the interrupting layers are selected from solder, thermoplastic resins and thermosetting resins.

5. The storage container of claim 4 wherein the electroplatable metal is selected from copper, gold, nickel or silver.

6. The storage container of claim 5 wherein the electroplatable metal is nickel, and the interrupting layer is solder.

7. The storage container of claim 5 wherein the electroplatable metal is nickel and the interrupting layers are comprised of alternating layers of solder and epoxy resin.

8. The storage container of claim 5 wherein the electroplatable metal is nickel and the interrupting layer is epoxy resin.

9. The storage container of claim 5 wherein the surface of the liner is crinkled.

10. The method of preparing a storage container for fluids as defined in claim 1, comprising the following steps in sequence: forming a liner by electroplating a metal onto the conductive surface of a mandrel, applying an interrupting layer comprising a solid impervious film forming material to the exposed surface of said metal, and applying thereover in an alternating sequence, additional layers of said metal and film forming material, and then surrounding the liner with a resin-impregnated glass filament reinforcing structure.

11. The method of claim 10 wherein a fitting plug is fitted to said mandrel prior to electrodeposition of said metal, and an additional amount of said metal is electroplated over the fitting plug-liner junction to form a smooth contoured liner.

12. The method of claim 10 wherein a crinkle design is imparted to the surface of the mandrel prior to electrodeposition of said metal.

References Cited

UNITED STATES PATENTS

| 3,053,741 | 9/1962 | Medina | 204—46 |
| 3,219,729 | 11/1965 | Meyers et al. | 220—64 |

JAMES B. MARBERT, Primary Examiner.